(12) United States Patent
Harper et al.

(10) Patent No.: US 7,546,744 B2
(45) Date of Patent: Jun. 16, 2009

(54) STORAGE TANK FOR A CRYOGENIC LIQUID AND METHOD OF RE-FILLING SAME

(75) Inventors: Gregory Harper, Vancouver (CA); Randall Mark, Nanoose Bay (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/949,450

(22) Filed: Dec. 3, 2007

(65) Prior Publication Data
US 2008/0134693 A1     Jun. 12, 2008

Related U.S. Application Data (63) Continuation of application No. PCT/CA2006/000898, filed on Jun. 1, 2006.

(51) Int. Cl.
*F17C 13/00*     (2006.01)
*F17C 5/02*      (2006.01)

(52) U.S. Cl. .................. 62/45.1; 62/50.7; 141/4

(58) Field of Classification Search .......... 62/45.1, 62/50.7; 141/4
See application file for complete search history.

(56) References Cited

U.S. PATENT DOCUMENTS

| | | | | |
|---|---|---|---|---|
| 2,993,344 | A | * | 7/1961 | Reed ............. 62/49.1 |
| 3,347,286 | A | * | 10/1967 | Smith ............ 141/39 |
| 3,366,139 | A | * | 1/1968 | Shaw ............ 137/565.14 |
| 3,812,888 | A | | 5/1974 | Dalton |
| 4,018,582 | A | | 4/1977 | Hinds et al. |
| 4,149,388 | A | * | 4/1979 | Schneider et al. ........ 62/50.3 |
| 4,350,017 | A | * | 9/1982 | Kneip et al. ............ 62/48.1 |
| 4,956,975 | A | | 9/1990 | Gustafson |
| 5,121,609 | A | * | 6/1992 | Cieslukowski ........... 62/50.4 |
| 5,249,425 | A | | 10/1993 | Longsworth |
| 5,370,159 | A | * | 12/1994 | Price ................ 141/4 |
| 5,421,160 | A | | 6/1995 | Gustafson et al. |
| 5,572,874 | A | | 11/1996 | Rathbone |

(Continued)

FOREIGN PATENT DOCUMENTS

EP     1457733     9/2004

(Continued)

*Primary Examiner*—William C Doerrler
(74) *Attorney, Agent, or Firm*—McAndrews, Held & Malloy, Ltd.

(57) ABSTRACT

A storage tank defines a cryogen space for storing a cryogenic liquid. The storage tank comprises a combined fill and vent assembly, which comprises a conduit having a first end with an opening disposed within an upper part of the cryogen space, and a second end outside of the cryogen space that is connected to a receptacle, to which a re-filling nozzle can be attached. A check valve disposed in the conduit allows flow only in the direction of filling the cryogen space with cryogenic liquid from the receptacle. A by-pass line is provided around the check valve with a valve disposed in the by-pass line that is operable to open or close to control flow through the by-pass line. The method comprises attaching a re-filling nozzle to the receptacle and opening the by-pass valve to vent vapor from the cryogen space to reduce vapor pressure therein and to cool the conduit, receptacle, re-filling nozzle, and fill line. After venting the storage tank, the by-pass valve is closed, and the storage tank can be re-filled through the receptacle and conduit.

43 Claims, 3 Drawing Sheets

U.S. PATENT DOCUMENTS

| | | |
|---|---|---|
| 5,699,839 A | 12/1997 | Dehne |
| 5,829,791 A | 11/1998 | Kotsubo et al. |
| 6,073,450 A | 6/2000 | Lak et al. |
| 2003/0070434 A1 * | 4/2003 | Shimada et al. ............. 62/45.1 |

FOREIGN PATENT DOCUMENTS

| | | |
|---|---|---|
| JP | 2002-068398 | 8/2002 |

* cited by examiner

STORAGE TANK FOR A CRYOGENIC LIQUID AND METHOD OF RE-FILLING SAME

CROSS-REFERENCE TO RELATED APPLICATION(S)

This application is a continuation of International Application No. PCT/CA2006/000898, having an international filing date of Jun. 1, 2006, entitled "Storage Tank for a Cryogenic Liquid and Method of Re-Filling Same". International Application No. PCT/CA2006/000898 claimed priority benefits, in turn, from Canadian Patent Application No. 2,506,606 filed Jun. 3, 2005. International Application No. PCT/CA2006/000898 is hereby incorporated by reference herein in its entirety.

FIELD OF THE INVENTION

The present invention relates to a storage tank for a cryogenic liquid and a method of re-filling same. More particularly, the storage tank comprises an integrated apparatus for re-filling and venting the cryogen space.

BACKGROUND OF THE INVENTION

Cryogenic liquids are liquefied gases that generally have boiling points below −100° C. (about −150° F.) at atmospheric pressure. Examples of cryogenic liquids include liquid natural gas (LNG), nitrogen, oxygen, carbon dioxide, methane and hydrogen.

Cryogenic liquids are usually stored in thermally insulated storage tanks that consist of an inner storage vessel mounted within an outer shell, with thermal insulation provided by insulating materials and a vacuum disposed in the space between the inner vessel and the outer shell. The inner vessel defines the cryogen space in which a cryogenic liquid can be stored. Such an arrangement reduces the transfer of heat from the ambient environment to the cryogenic liquid stored within the cryogen space. Such heat transfer is also known as "heat leak" and it is desirable to reduce heat leak into the cryogen space. Heat leak results in vaporization of cryogenic liquid, which in turn results in raising the vapor pressure in the cryogen space. If the vapor pressure in the cryogen space rises above the set point of the pressure relief valve, vapor is vented to atmosphere. To avoid wasting cryogenic liquid through venting, and the consequent release of the stored fluid into the environment, it is desirable to design storage tanks to reduce heat leak so that cryogenic liquids can be stored for longer periods of time without venting. Each pipe that penetrates through the insulating space and into the cryogen space provides a thermal conduction path that can contribute to heat leak.

Conventional storage tanks for cryogenic liquids employ separate pipes for filling and venting the cryogen space. Vent pipes are provided with a pressure relief valve that opens if the vapor pressure within the cryogen space exceeds a predetermined set point, selected based on the designed pressure rating of the storage tank. Fill pipes and vent pipes can both have open ends in the upper portion of the cryogen space that is normally occupied by vapor. For reasons of safety, design codes typically require an arrangement that prevents cryogenic fluid from escaping from the storage tank through the fill pipe, and conventional fill pipes typically employ a check valve for this purpose. Consequently, with conventional storage tanks, this check valve makes the fill line unsuitable for use as a vent line.

For example, U.S. Pat. No. 5,572,874, entitled, "Relief Valve Construction to Minimize Ignition Hazard from Cryogenic Storage Tanks Containing Volatile Liquids" discloses an arrangement for venting from the cryogen space of a storage tank for cryogenic liquids. In this example, one or more dedicated vent pipes are employed with respective pressure relief valves. It is common in some storage tanks to employ two pressure relief valves in case one of the valves malfunctions or in case the vent line associated with one of the pressure relief valves becomes blocked, hi such arrangements, the set point for opening the pressure relief valves can be higher for one of the pressure relief valves.

U.S. Pat. No. 4,956,975, entitled, "Shutoff Valve for Cryogenic Liquid Storage Tank" discloses another arrangement for a vent line that comprises a shutoff valve in the vent line that is closed by the momentum of the flow of cryogenic liquid when the storage tank is filled to its maximum capacity. Like other known storage tanks for cryogenic liquids, a dedicated pipe is employed as a vent line. In the disclosed arrangement one pipe is employed for filling and withdrawing cryogenic liquid from the bottom of the cryogen space. A disadvantage of filling through such a pipe is that when filling the storage tank, the incoming cryogenic liquid is not as effective at condensing vapor that might be inside the cryogen space. Preferred designs employ fill pipes that open into the upper part of the cryogen space where the cryogenic liquid can be sprayed to condense vapor and reduce vapor pressure, allowing faster and/or more efficient refilling.

When beginning to re-fill a storage tank with cryogenic liquid, the fill line may initially be at a temperature that causes some of the cryogenic liquid to be vaporized until the cryogenic liquid cools the fill line. It would be an improvement to reduce the amount of cryogenic liquid that is vaporized while cooling the fill line.

SUMMARY OF THE INVENTION

A storage tank for a cryogenic liquid is provided that comprises an inner vessel defining a cryogen space within which a cryogenic liquid can be stored. An outer shell surrounds the inner vessel, with a support structure for holding the inner vessel spaced apart from the outer shell, whereby an insulating space is defined between the inner vessel and the outer shell. The storage tank further comprises a combined fill and vent assembly, which comprises a conduit having a first end with at least one opening disposed within an upper part of the cryogen space, and a second end outside of the outer shell that is connected to a receptacle, to which a re-filling nozzle can be attached to supply the cryogenic liquid to the cryogen space through the conduit. A check valve is disposed in the conduit, allowing flow only in the direction of filling the cryogen space with cryogenic liquid from the receptacle. A by-pass line is provided with one end communicating with the conduit between the check valve and the cryogen space, and a second end communicating with the conduit between the check valve and the receptacle, and a valve disposed in the by-pass line that is operable to an open position wherein fluid is allowed to flow through the by-pass line and a closed position wherein fluid is blocked from flowing through the by-pass line.

The receptacle preferably comprises a shut off valve with a valve member that is biased against a seat. Cryogenic liquid can not flow through the receptacle when the valve member is in contact with the seat. The valve member is mechanically moved away from the seat when a re-filling nozzle is attached to the receptacle. This is an additional safety feature for stopping cryogenic liquid from leaking from the receptacle when the re-filling nozzle is disconnected from it.

In a preferred embodiment, the by-pass line is configured to restrict flow therethrough compared to the conduit, such that higher fluid flow rates are permitted through the conduit. That is, the by-pass line can employ passages with a smaller cross-sectional flow area compared to that of the conduit or an orifice can be provided in the by-pass line. The conduit can also be a straighter flow path compared to the by-pass line. The reason for restricting flow through the by-pass line is that the size of the by-pass line does not need to be as large as the conduit, because the by-pass line functions to vent vapor from the cryogen space while the conduit also functions to fill the cryogen space, and higher flow rates are beneficial for this additional purpose. Also, in the event of the shut off valve associated with the receptacle malfunctioning and the manually operated by-pass valve being left open, the smaller size of the by-pass line reduces the rate at which the cryogenic fluid can leak from the cryogen space.

In a preferred embodiment the combined fill and vent assembly comprises an integrated valve assembly comprising a body in which the check valve is mounted, an inlet opening with a flange mountable onto a corresponding flange of the conduit where the conduit exits the outer shell, passages provided within the body that serve as respective portions of the conduit and the by-pass line, and a mounting location for the by-pass valve so that it can be mounted directly onto the body. The body can be a one-piece body or comprise a plurality of blocks that can be fastened together to provide a unified body. Using a plurality of blocks can facilitate the manufacture of the body. In some embodiments, the receptacle can also be mounted directly onto the body, with the body having an integral coupling for receiving the receptacle, or by way of a separate fitting, but in either case, such an arrangement can be advantageous in eliminating the need for a pipe between the body and the receptacle.

In preferred embodiments, the first end of the conduit with its at least one opening is disposed in a part of the cryogen space that is normally occupied with vapor when the storage tank is filled with a cryogenic liquid. In this disclosure, "vapor" is defined to be synonymous with "gas". Vapor can form inside the cryogen space by vaporization of the cryogenic liquid, which can result when heat leaks into the cryogen space. While some definitions of "vapor" confine vapors to gases that can be turned into a liquid by compression alone, in this disclosure, vapor is defined more broadly to include gases that can be condensed back into liquid by a reduction in temperature, for example, when a cryogenic liquid is sprayed into the vapor space during the re-filling process. Accordingly, the end of the conduit that is disposed in the upper part of the cryogen space can have a plurality of openings through which the cryogenic liquid can be sprayed into the cryogen space when the storage tank is being filled.

The combined fill and vent assembly can further comprise a vent line that comprises one end in communication with the conduit between the check valve and the cryogen space, and a second end in communication with a vent stack through which vented vapor can be dissipated. A pressure relief valve disposed in the vent line that is biased in a closed position governs flow through the vent line. The pressure relief valve opens when pressure in the conduit exceeds a predetermined set point. In a preferred embodiment, the predetermined set point for the pressure relief valve is about 1.4 MPa (about 210 psi). In other embodiments, the predetermined set point for the pressure relief valve is a selected value less than 2.4 MPa (less than about 350 psi).

When the combined fill and vent assembly comprises a vent line and pressure relief valve, these elements can be incorporated into the integrated valve assembly by providing passages within the body for the vent line and a location for mounting the pressure relief valve into the body in an arrangement such that the pressure relief valve can be positioned to govern flow through the vent line. Accordingly, the body of the integrated valve assembly provides a modular base to (or within) which can be mounted the check valve, the by-pass valve, and the pressure relief valve, and internal passages for the conduit, the by-pass line, and the vent line. The body can comprise at least two blocks that can be fastened together to form the body, which facilitates manufacture of the body with the internal passages, and that provides a housing that surrounds the pressure relief valve.

The combined fill and vent assembly can further comprise a secondary vent line comprising one end in communication with the conduit between the check valve and the cryogen space, and a second end in communication with the vent line between the pressure relief valve and the vent stack. A secondary vent valve disposed in the secondary vent line governs the flow through the secondary vent line. The secondary vent line can be a second pressure relief valve or a manually operable vent valve. A manually operable vent valve can be employed to provide the operational flexibility to vent the storage tank when the vapor pressure is less than the set point for opening the pressure relief valve, and when the receptacle is not attached to a re-filling nozzle. Alternatively, if the second vent valve is a second pressure relief valve, it can be employed to provide an extra margin of safety with one of the pressure relief valves having a higher set point for opening. Having two pressure relief valves provides an extra level of protection in case one of the pressure relief valves becomes seized shut or otherwise malfunctions. When a secondary vent line is employed, passages for the secondary vent line and a mounting location for the secondary vent valve can be provided within the body of the integrated valve assembly to thereby incorporate these components into the integrated valve assembly.

In a preferred arrangement, the conduit penetrates through the outer shell and the inner vessel at a point where the conduit can be integrated with elements of the support structure. By integrating the conduit with the support structure it is possible to reduce the heat leak into the cryogen space by reducing the number of heat transfer paths.

The storage tank can further comprise a pressure gauge in communication with the conduit between the check valve and the cryogen space. With the integrated valve assembly, a connection can be provided in the body in communication with the conduit, to which the pressure gauge can be connected.

Also provided is a combined fill and vent assembly by itself, for use with a storage tank for a cryogenic liquid. The combined fill and vent assembly comprises an integrated valve assembly comprising a body in which a check valve and a by-pass valve are mounted. The body comprises fluid passages provided therein to allow fluid to flow through the body between a conduit that is connectable to a nozzle receptacle and a flanged connection that can be mounted to a corresponding flange of the storage tank. The fluid passages provide a one-way fluid path from the receptacle to the flanged connection through the check valve and a by-pass passage through which fluid can flow from the flanged connection to the receptacle through the by-pass valve when the by-pass valve is open. The combined fill and vent assembly can further comprise a pressure relief valve mounted to the body and additional fluid passages within the body through which fluid can be vented from the flanged connection to a vent line, through the pressure relief valve. Additionally, the combined fill and vent assembly can further comprise a second vent valve mounted to the body and additional fluid passages within the body through which fluid can be vented from the flanged connection to the vent line, through the second vent valve. The second vent valve can be a manually operable valve or a second pressure relief valve with a pressure set point for opening that can be set higher than that of the other pressure relief valve.

A method of re-filling a storage tank with a cryogenic liquid uses the disclosed apparatus. The method comprises:

attaching a re-filling nozzle to a receptacle mounted on a conduit that communicates between the receptacle and a cryogen space defined within the storage tank;

opening a by-pass valve to vent vapor from the cryogen space through a by-pass line that communicates with the conduit on opposite sides of a check valve, until vapor pressure within the cryogen space is reduced to a predetermined value and directing the vented vapor from the cryogen space, through the conduit, through the re-filling nozzle and back through a fill line associated with the re-filling nozzle, thereby pre-cooling the re-filling nozzle and the fill line; and after shutting the by-pass valve, directing a cryogenic liquid into the cryogen space through the conduit and the check valve.

In a preferred method the predetermined value that pressure is reduced to within the cryogen space is atmospheric pressure.

The method preferably comprises, when filling the cryogen space with the cryogenic liquid, directing the cryogenic liquid into an upper portion of the cryogen space, which is normally occupied with vapor when the cryogen space is filled. By directing the cryogenic liquid into the upper portion of the cryogen space, vapor remaining in that portion of the cryogen space can be condensed back into liquid.

The cryogenic liquid can be selected from the group consisting of natural gas, nitrogen, oxygen, carbon dioxide, methane, and hydrogen. In preferred embodiments, the cryogenic liquid is a fuel that is combustible in an internal combustion engine.

Under normal operating conditions, the method is employed to vent the cryogen space through the conduit, the receptacle, the re-filling nozzle, and the fill line to pre-cool these components prior to re-filling, and the thermal insulation provided around the storage tank reduces heat leak into the cryogen space to a level that makes it unnecessary to vent the cryogen space between re-filling. However, there can be certain predetermined conditions that require venting the cryogen space between re-filling. For example, one such predetermined condition is when vapor pressure rises above a predetermined pressure threshold. For safety reasons, to guard against damaging the storage tank, the method comprises venting vapor from the cryogen space by operation of a pressure relief valve. Under other conditions, the operator can decide to manually vent the cryogen space, for example, when it is known that the storage tank will be idle for an extended period of time, and it is desirable to vent the cryogen space at a time and place of the operator's choosing, instead of waiting for the vapor pressure to rise above the set point for the pressure relief valve as a result of heat leak into the cryogen space.

The method preferably comprises surrounding the pressure relief valve with a housing that seals it from the surrounding atmosphere. This protects the pressure relief valve from ice build up cause by the freezing of water from the air, and from dirt, grease, cleaners, and other contamination that might otherwise come into contact with it.

Accordingly, with the disclosed storage tank for a cryogenic liquid and method it is possible to vent vapor from the cryogen space through a pipe that can also be employed to fill the cryogen space with a cryogenic liquid. This method allows venting the storage tank prior to re-filling, and using the vented vapor to pre-cool the fill line. The shared vent and fill line also reduces the number of heat transfer paths into the cryogen space, reducing heat leak. The integration of the fill line with the vent line can also result in a less complex piping arrangement, with less joints, resulting in less opportunity for leaks. This simplification of the piping arrangement over conventional designs also makes it possible to reduce manufacturing costs.

BRIEF DESCRIPTION OF THE DRAWINGS

FIGS. 2 and 3 show how the combined fill and vent line assembly can be configured to provide a simplified arrangement with fewer connections.

DETAILED DESCRIPTION OF PREFERRED EMBODIMENT(S)

Figure 1:
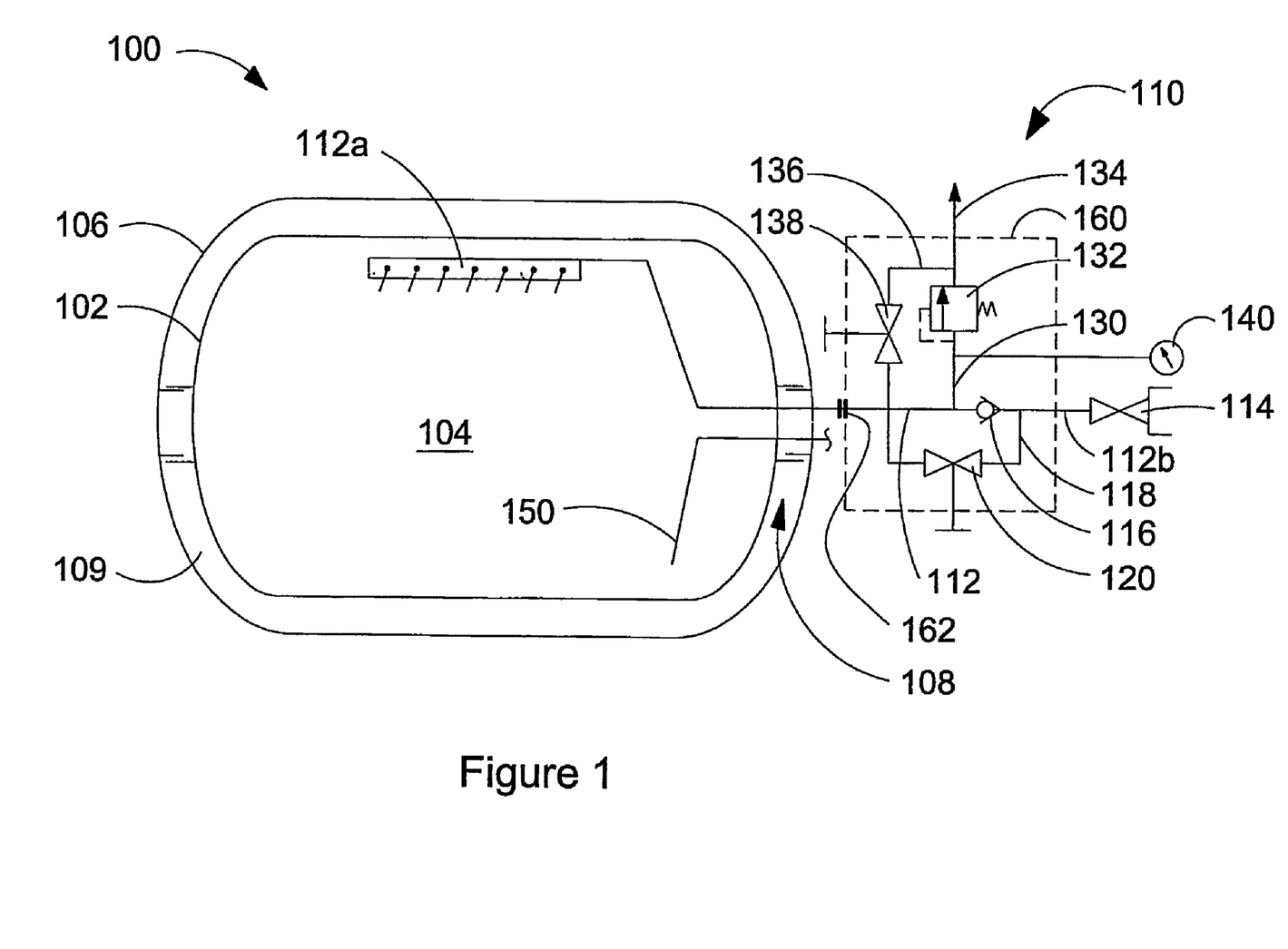
FIG. 1 is a schematic illustration of a storage tank with an arrangement for a combined fill and vent line assembly.

Referring to the schematic illustration of FIG. 1, storage tank 100 comprises inner vessel 102 defining cryogen space 104, outer shell 106 surrounding inner vessel 102, and support structure 108 for holding inner vessel 102 spaced apart from outer shell 106, whereby insulating space 109 is defined between inner vessel 102 and outer shell 106.

Combined fill and vent assembly 110 comprises conduit 112 having first end 112a with at least one opening disposed within an upper part of the cryogen space, and second end 112b outside of outer shell 106 and connected to receptacle 114. When a storage tank for cryogenic liquids is filled, normally a portion of the cryogen space is reserved for vapor. Filling cryogen space 104 completely with liquid would result in a very short holding time before vapor is vented from cryogen space 104 to relieve the vapor pressure. This is because even a small amount of heat leak into the cryogen space 104 would result in vaporization of some of the liquid, and with little or no space left for vapor the vapor pressure would quickly rise to a level that opens the pressure relief valve resulting in vapor being vented from cryogen space 104. Accordingly, to increase holding time and to reduce the likelihood of the need to vent vapor to reduce vapor pressure, when re-filling storage tank 100, a portion of cryogen space 104 is preferably left as vapor space, in what is sometimes referred to as the ullage space. The upper part of the cryogen space where first end 112a is disposed is preferably a part of cryogen space 104 that is normally occupied with vapor when the storage tank is filled with cryogenic liquid. Some storage tanks are designed with a cryogen space that has an ullage space partitioned from the main storage volume into which the cryogenic liquid is introduced when the tank is being filled. The ullage space communicates with the main storage volume but flow therebetween is restricted so that re-filling can be controlled to stop when the main storage volume is full and the partitioned ullage space helps to reserve a portion of the cryogen space for vapor. For storage tanks with a partitioned ullage space, first end 112a of conduit 112 is positioned in the upper part of the main storage volume so that cryogenic liquid is not introduced directly into the partitioned ullage space, and cryogenic liquid being introduced can condense the vapor in the larger main storage volume. With such an arrangement, although first end 112a is positioned in the upper part of the main storage volume, it can be submerged in the cryogenic liquid when the main storage volume is filled because the vapor space is initially in the partitioned ullage space until equilibrium in the cryogenic liquid level is established between the main storage volume and the ullage space.

Receptacle 114 provides an attachment point for fluid-tight attachment of a re-filling nozzle so that storage tank 100 can be re-filled with a cryogenic liquid through conduit 112. In preferred embodiments, receptacle 114 comprises a valve mechanism that is openable when a re-filling nozzle is attached to the receptacle and that closes when the re-filling nozzle is removed from the receptacle. For example, a mechanical arrangement can be provided to automatically displace a valve member to an open position when the re-filling nozzle is attached, and a spring can be employed to bias the valve member to a closed position when the re-filling nozzle is removed.

The schematic of FIG. 1 shows a plurality of openings at first end 112a through which a cryogenic liquid can be sprayed into the upper part of cryogen space 104 to condense vapor and reduce vapor pressure when storage tank 100 is being re-filled. Reducing vapor pressure inside cryogen space 104 is desirable during re-filling because it reduces back-pressure and allows faster and more efficient re-filling.

Check valve 116 is disposed in conduit 112 to allow flow through conduit 112 only in the direction of filling cryogen space 104 from receptacle 114. By-pass line 118 has one end communicating with conduit 112 between check valve 116 and cryogen space 104, and a second end communicating with conduit 112 between check valve 116 and receptacle 114. By-pass valve 120 is disposed in by-pass line 118 and is operable to an open position wherein fluid is allowed to flow through by-pass line 118 and a closed position wherein fluid is blocked from flowing through by-pass line 118.

In preferred embodiments combined fill and vent assembly 110 further comprises vent line 130, pressure relief valve 132, vent line 134, by-pass vent line 136, and manual vent by-pass valve 138. Vent line 130 communicates with conduit 112 between check valve 116 and cryogen space 104 so that vapor can be vented from cryogen space 104 at any time. Vent line 130 is connected to pressure relief valve 132, which can be spring biased in a closed position, and automatically switched to an open position when vapor pressure in cryogen space 104 exceeds a predetermined set point. The set point is normally less than the design pressure limit of storage tank 100, by an amount that includes a safety factor as required by the design codes of the jurisdiction(s) where the storage tank will be in service. For example, compared to the high-pressure vessels used to store compresses gases at pressures of 20.7 MPa (3000 psi) and higher, cryogenic liquids are normally stored at relatively low pressures, and the set point for opening pressure relief valve can be a predetermined value less than 2.4 MPa (less than about 350 psi). In a preferred embodiment for storage tanks for use in North America, the predetermined set point for the pressure relief valve can be about 1.4 MPa (about 210 psi). The outlet of pressure relief valve 132 is connected to vent line 134 which can direct vented vapor to a vent stack, or to a recovery system for low-pressure gas.

By-pass vent line 136 also communicates at one end with conduit 112 between check valve 116 and cryogen space 104, and at the other end, by-pass vent line 136 communicates with vent line 134. Vent by-pass valve 138 can be a manually operable valve, as shown in FIG. 1, or it can be a secondary pressure relief valve, with a higher set point than pressure relief valve 132. The purpose of having a manually operable valve on by-pass vent line 136 would be to provide a way to relieve vapor pressure in cryogen space 104 when vapor pressure is less than the predetermined set point for opening pressure relief valve 132, and when vapor pressure can not be vented through by-pass valve 120 and receptacle 114, for example, when the storage tank is not at a re-filling station. Alternatively, vent by-pass valve 138 can be a secondary pressure relief valve, provided as a safety measure against the possibility of pressure relief valve 132 becoming seized shut or otherwise malfunctioning. If vent by-pass valve 138 is not a secondary pressure relief valve, a secondary pressure relief valve can be provided in association with the piping for discharge pipe 150.

For indicating the vapor pressure inside cryogen space 104, pressure gauge 140 can be provided to measure fluid pressure in conduit 112 or vent line 130. Rather than introduce a separate probe into cryogen space 104, which would add another path for heat leak, pressure gauge 140 can measure pressure in cryogen space 104 indirectly by measuring fluid pressure in conduit 112 or vent line 130.

As shown in the example illustrated by FIG. 1, a separate means such as pipe 150 is employed to remove cryogenic liquid from cryogen space 104. When storage tank 100 is being employed by a user of low-pressure gas, a simple discharge pipe such as illustrated pipe 150 can be employed. Vapor pressure within cryogen space 104 can be utilized to push cryogenic liquid from cryogen space 104 as it is needed and a pressure control valve (not shown) can be employed to regulate flow. For a system for supplying a high-pressure gas, a cryogenic pump (not shown) can be employed to pump the cryogenic liquid before it is vaporized. The cryogenic pump can be disposed inside cryogen space 104 or have just a suction inlet disposed inside cryogen space 104, or pipe 150 can be employed to direct the cryogenic liquid to a sump from which the cryogenic liquid can be pumped. That is, while combined fill and vent assembly 110 uses only one conduit 112 that penetrates through insulation space 109 for serving a number of different purposes, reducing the number of heat transfer paths normally provided by conventional configurations, a separate pipe or pump is required to penetrate through insulation space 109 for removing cryogenic liquid for supply to the end user.

Figure 2:
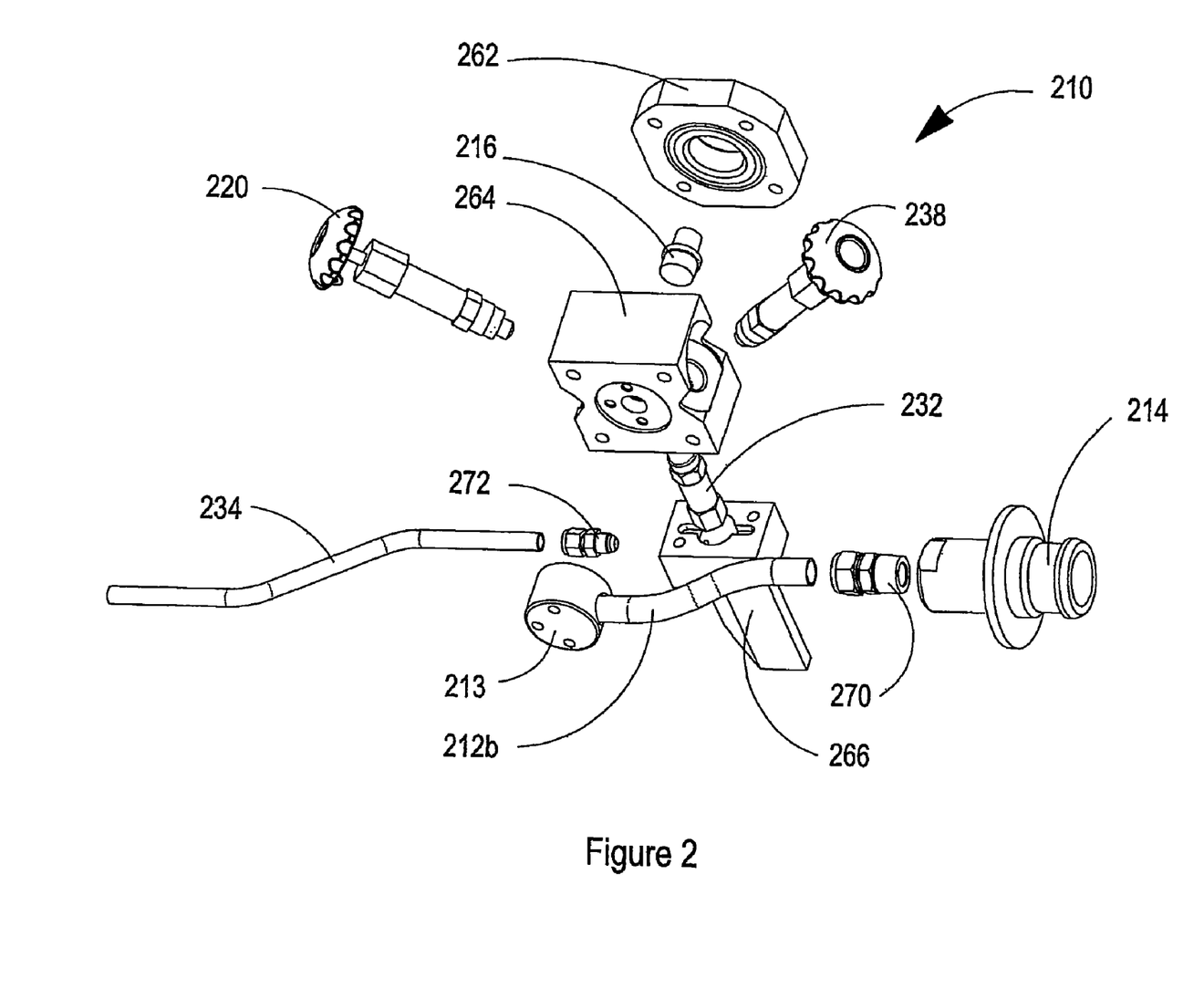
FIG. 2 is an exploded view of a preferred embodiment of a combined fill and vent line assembly.
Figure 3:
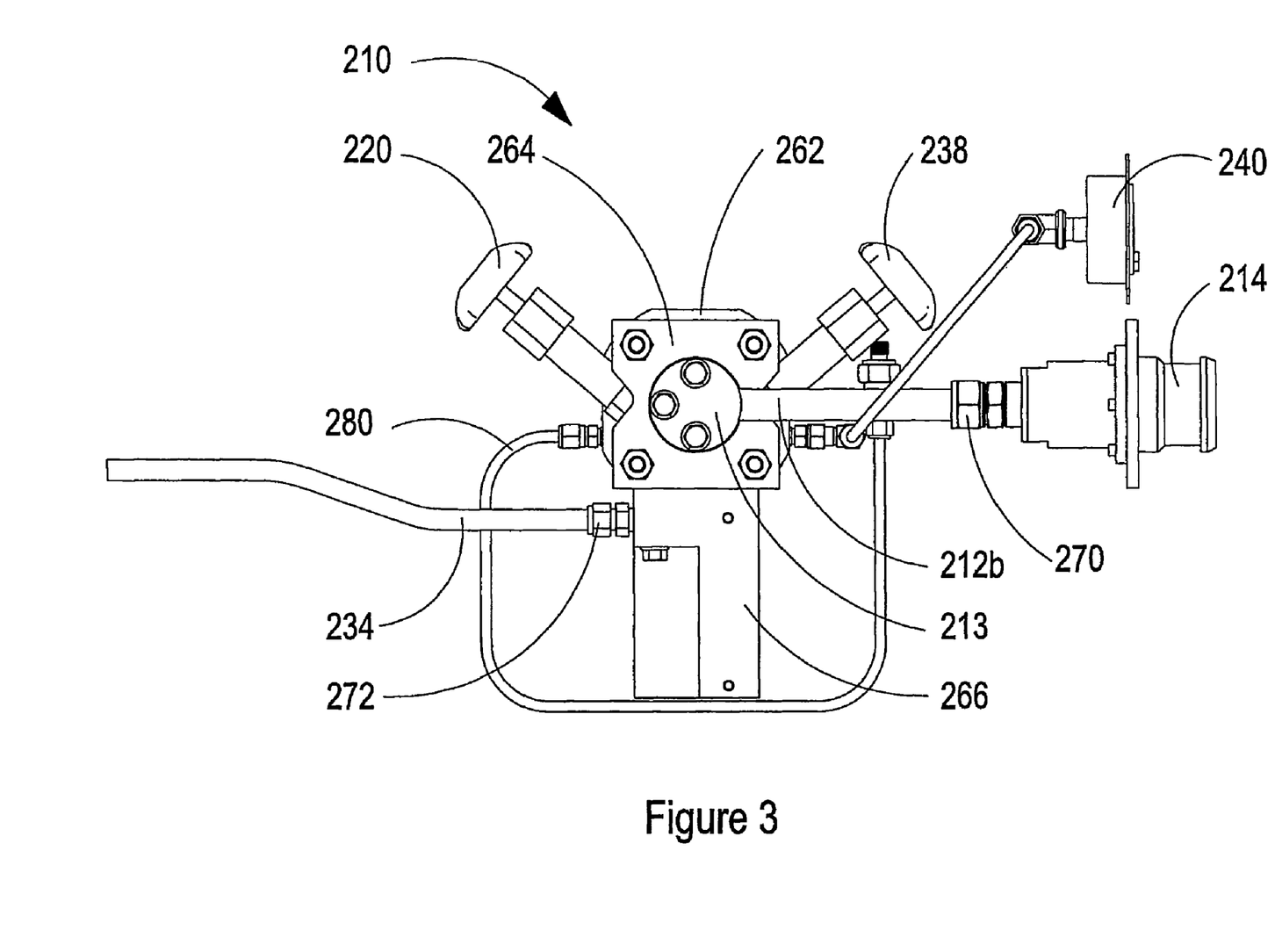
FIG. 3 is an end view of the preferred embodiment of FIG. 2.

Dashed line 160 shows the components and fluid passages that can be combined and integrated by a combined fill and vent assembly 110 made according to the arrangement shown in FIGS. 2 and 3. The fluid passages within dashed line 160 can be provided within a solid body, into which check valve 116, by-pass valve 120, pressure relief valve 132, and vent by-pass valve 138 can all be mounted, to avoid separate piping therebetween, which would introduce more joints and possible leak paths, as well as high manufacturing costs because of the labor and/or time required to pipe between the separate components. The solid body can comprise flange 162 for attaching the portion of conduit 112 that is provided inside the solid body with the portion of conduit 112 that extends into cryogen space 104 and to first end 112a.

In the schematic view of FIG. 1, conduit 112 is shown penetrating through insulation space 109 near the central longitudinal axis of storage tank 100. In a preferred embodiment conduit 112 penetrates through outer shell 106 and inner vessel 102 at a point where the conduit can be integrated with elements of the support structure. Such integration between conduit 112 and the support structure can advantageously further reduce the number of heat transfer paths into cryogen space 104.

With reference now to FIGS. 2 and 3, a physical arrangement of the schematic arrangement for the combined fill and vent assembly of FIG. 1 is illustrated, with like features labeled with like reference numbers increased by one-hundred.

To integrate components and reduce the number of pipes and connections between valves, combined fill and vent assembly 210 employs a body with internal fluid passages. In the illustrated embodiment, the body is a three-piece body comprising flange 262, main body 264, and pressure relief valve housing 266, which can be joined together to form a solid body. It will be understood that without departing from the scope of the present disclosure, the solid body can be formed from a different number of pieces, such as two or more than three pieces. However, it is desirable to reduce the number of pieces to simplify the design and reduce the number of components and seals between components. Seals, such as gasket seals or o-ring seals can be provided between the mating faces of flange 262, main body 264, and pressure relief housing 266. Like schematically depicted flange 162 of FIG. 1, flange 262 is attachable to a corresponding flange provided on a conduit that extends from the flange to the first end of the conduit that is disposed inside the cryogen space (not shown in FIGS. 2 and 3, but shown schematically as first end 112a in FIG. 1).

Internal fluid passages are provided within the assembled solid body to provide the fluid connections between the valve components as shown schematically inside dashed line 160 in FIG. 1. In the illustrated exploded view of FIG. 2, check valve 216 is shown between flange 262 and main body 264, indicating that when the body is assembled, check valve 216 is held therebetween. Check valve 216 can be mounted on main body 264 and flange 262 can be made an integral piece of main body 264. By-pass valve 220 is mountable with its valve mechanism inside main body 264 to function in the same way as by-pass valve 120 to allow vapor inside the storage tank's cryogen space to be vented through conduit 212b and receptacle 214, by-passing check valve 216, and allowing the vented vapor pressure to pre-cool the fill line.

Pressure relief valve 232 is mounted to main body 264 between main body 263 and pressure relief valve housing 266. Pressure relief valve housing 266 includes internal passages for connecting the outlet from pressure relief valve 232 and a by-pass vent line from vent by-pass valve 238 to vent line 234, which leads to a vent stack or to a low-pressure gas recovery system. Because the fluid passages in housing 266 are downstream from pressure relief valve 232 and vent by-pass valve 238, the pressure of the vented vapor is normally lower than the pressure of the fluid in other parts of the solid body. In addition to providing integrated fluid passages for the vent lines, housing 266 also surrounds pressure relief valve 232 to protect it from the surrounding environment. Pressure relief valve 232 could require more frequent servicing if left exposed to dirt and other contaminants. Exposure even to air can be undesirable if it results in ice build up around pressure relief valve 232.

Seals, such as o-rings, for example, can be employed to seal where the valves and couplings are mounted to main body 264. Coupling 213 is employed to provide a fluid-tight connection between conduit 212b and main body 264. Coupling 270 connects conduit 212b to receptacle 214, which preferably has an integrated shut-off valve that is openable when receptacle 214 is attached to a re-filling nozzle. Coupling 272 connects vent pipe 234 to pressure relief housing 266.

An advantage of disclosed combined fill and vent assembly 210 is that all of the valves are located outside the storage tank where they can be easily accessed for operation and maintenance. The amount of piping is reduced by employing a solid body with internal fluid passages to provide an integrated assembly that has fewer parts, less connections for assembly and reduced potential for leaks, and shorter distances between components, compared to conventional arrangements that employ piping between each valve in the assembly. In addition, combined fill and vent assembly 210 reduces the number of pipes that extend through the insulation space and into the cryogen space.

Yet another advantage of combined fill and vent assembly 210 is that the same components can be employed to orient conduit 212b and receptacle 214 in a plurality of directions, since coupling 213 is attached with three bolts and main body 264 can be manufactured with four bolt holes. Those skilled in the technology will understand that other bolt patterns can be employed to achieve the same configuration flexibility. This feature can be advantageous, for example, when the storage tank is a fuel tank mounted to a vehicle. To increase the amount of fuel that can be stored on-board a vehicle, fuel tanks can be mounted to the vehicle on both the curb-side and the road-side. The modular construction of combined fill and vent assembly 210 allows the same components to be used for all fuel tanks with receptacle 214 accessible from the side of the vehicle whether the fuel tanks are mounted on the curb-side or the road-side of the vehicle, reducing parts inventory for manufacturing and maintenance. The modular design offers the same configuration flexibility for vent line 234. As shown in FIG. 2, pressure relief valve housing 266 preferably has a mounting pattern that allows it to be attached in at least two ways so that vent line 234 can be attached extending towards the left as shown in FIG. 3, or in the opposite direction towards the right, if pressure relief valve housing 266 is mounted so that the outlet to vent line 234 faces in the opposite direction. With reference to FIG. 3, the design of main body 264, pressure relief valve housing 266, and coupling 213 allows the same components to be assembled with the mirror image for the orientation of vent line 234 and conduit 212b.

As shown by FIG. 3, additional components can be incorporated into the integrated valve assembly. Pressure gauge 240 can communicate with the main conduit itself between check valve 216 and flange 262, or with the vent line passages provided inside main body 264 between the main conduit and vent valves 232 and 238, via a conduit that is connected by a coupling to a port provided in the side of main body 264, wherein the "main conduit" herein referred to is a conduit comprising passages inside main body 264 which serve in the same capacity as conduit 112 shown schematically in FIG. 1. Tubing 280 can be employed to guide a signal wire into main body 264 where it can be threaded through the main conduit at a point between check valve 216 and flange 262, and from that point, on into the cryogen space where it can be connected to an instrument such as a level sensor. Integration of components by employing the body of the integrated valve assembly reduces the number of individual pipes and connections, and can also reduce the number of heat transfer paths into the cryogen space, compared to conventional storage tanks that can use separate elements penetrating through the tank insulation for separate components for filling, venting, pressure measurements, and level measurements.

The disclosed apparatus allows an improved method of re-filling a storage tank with a cryogenic liquid. With reference to FIGS. 1 through 3, the method comprises attaching a re-filling nozzle to receptacle 114, 214, which is connected to conduit 112 that communicates between receptacle 114, 214 and cryogen space 104. The method then comprises opening by-pass valve 120, 220 to vent vapor from cryogen space 104 through by-pass line 118, which communicates with conduit 112 on opposite sides of check valve 116, 216. Vapor that is vented from cryogen space 104 is directed through conduit 112b, 212b, receptacle 114, 214, and then back through the re-filling nozzle and the fill line, thereby pre-cooling the re-filling nozzle and the fill line. When vapor pressure within cryogen space 104 is reduced to a predetermined value, by-pass valve 120, 220 is closed, and cryogenic liquid is directed into cryogen space 104 via conduit 112, receptacle 114, 214, and the pre-cooled re-filling nozzle and fill line.

The predetermined value to which vapor pressure is reduced prior to re-filling can be atmospheric pressure or some other predetermined value. Pressure gauge 140, 240 can be used to monitor vapor pressure during the venting stage.

The method can further comprise venting through conduit 112 and through vent line 134, 234 when vapor pressure within cryogen space 104 exceeds a predetermined set point and opens pressure relief valve 132, 232, or when by-pass vent by-pass valve 138, 238 is manually opened. Vent by-pass valve 138, 238 provides a manual option for venting storage tank 100, for example, when vapor pressure is lower than the set point for the pressure relief valve, and the vehicle is not at a re-filling station, or if the re-filling station is not equipped to receive vapor vented through the fill line.

The disclosed method and apparatus is suitable for storage tanks designed for storing cryogenic liquids selected from the group consisting of natural gas, nitrogen, oxygen, carbon dioxide, methane, and hydrogen. If the cryogenic liquid is a fuel that is combustible in an internal combustion engine, the storage tank and method can be employed for a vehicular fuel tank for storing fuel that can be supplied to a vehicle's engine, or other mobile applications, such as a storage tank mountable on a vehicle for transporting cryogenic liquids.

Storage tanks are normally re-filled from a station or a mobile storage tank for dispensing cryogenic liquids. The re-filling nozzle and fill line is normally used intermittently to re-fill storage tanks. In between fillings ambient temperatures can warm the fill line and the re-filling nozzle, which means that cryogenic liquids flowing through the fill line will be flashed to vapor until the fill line is cooled to a temperature below the flash point for the cryogenic liquid. Storage tanks are typically vented before they are re-filled to reduce the vapor pressure inside the cryogen space. In such cases, because the vapor is near the flash temperature of the cryogenic liquid, which is much colder than typical ambient conditions, there is a benefit to venting vapor from the storage tank back through the fill line to pre-cool the re-filling nozzle and fill line prior to re-filling.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A storage tank for a cryogenic liquid, said storage tank comprising:
    an inner vessel defining a cryogen space within which said cryogenic liquid can be stored;
    an outer shell surrounding said inner vessel;
    a support structure between said inner vessel and said outer shell for holding said inner vessel spaced apart from said outer shell, whereby an insulating space is defined between said inner vessel and said outer shell;
    a combined fill and vent assembly comprising:
        a conduit having a first end with at least one opening disposed within an upper part of said cryogen space, and a second end outside of said outer shell that is connected to a receptacle, to which a re-filling nozzle can be attached to supply said cryogenic liquid to said cryogen space through said conduit;
        a check valve disposed in said conduit, said check valve allowing flow only in the direction of filling said cryogen space with cryogenic liquid from said receptacle; and
        a by-pass line with one end communicating with said conduit between said check valve and said cryogen space, and a second end communicating with said conduit between said check valve and said receptacle, and a by-pass valve disposed in said bypass line and operable to an open position wherein fluid is allowed to flow through said by-pass line and a closed position wherein fluid is blocked from flowing through said bypass line.

2. The storage tank of claim 1 wherein said combined fill and vent assembly comprises an integrated valve assembly comprising a body in which said check valve is mounted, an inlet opening with a flange mountable onto a corresponding flange of said conduit where said conduit exits said outer shell, passages provided within said body that serve as respective portions of said conduit and said by-pass line, and a mounting location for said by-pass valve, which is mountable directly onto said body.

3. The storage tank of claim 2 wherein said body comprises at least two blocks that can be fastened together to form said body.

4. The storage tank of claim 2 wherein said receptacle is mountable directly onto said body.

5. The storage tank of claim 1 wherein said first end of said conduit and said at least one opening are disposed in a part of said cryogen space that is normally occupied with vapor when said storage tank is filled with a cryogenic liquid.

6. The storage tank of claim 5 wherein said at least one opening is one of a plurality of openings through which said cryogenic liquid can be sprayed into said cryogen space when said storage tank is being filled.

7. The storage tank of claim 1 further comprising a vent line that comprises one end communicating with said conduit between said check valve and said cryogen space, and a second end communicating with a vent stack through which vented vapor can be dissipated, and a pressure relief valve disposed in said vent line that is biased in a closed position and that opens when pressure in said conduit exceeds a predetermined set point.

8. The storage tank of claim 7 wherein said combined fill and vent assembly comprises an integrated valve assembly comprising a body in which said check valve is mounted, an inlet opening with a flange mountable onto a corresponding flange of said conduit where said conduit exits said outer shell, passages provided within said body that serve as respective portions of said conduit, said by-pass line, and said vent line, and respective mounting locations for mounting said by-pass valve and said pressure relief valve directly onto said body.

9. The storage tank of claim 8 wherein said body comprises at least two blocks that can be fastened together to form said body, which provides a housing that surrounds said check valve and said pressure relief valve.

10. The storage tank of claim 8 wherein said receptacle is mountable directly onto said body.

11. The storage tank of claim 7 wherein said predetermined set point for said pressure relief valve is 1.4 MPa (about 210 psi).

12. The storage tank of claim 7 wherein said predetermined set point for said pressure relief valve is a selected value less than 2.4 MPa (less than about 350 psi).

13. The storage tank of claim 7 further comprising a secondary vent line comprising one end communicating with said conduit between said check valve and said cryogen space, and a second end communicating with said vent line between said pressure relief valve and said stack, and a manually operable vent valve disposed in said secondary vent line.

14. The storage tank of claim 13 wherein said combined fill and vent assembly comprises an integrated valve assembly comprising a body in which said check valve is mounted, an inlet opening with a flange mountable onto a corresponding flange of said conduit where said conduit exits said outer shell, passages provided within said body that serve as respective portions of said conduit, said by-pass line, said vent line, and said secondary vent line, and respective mounting locations for mounting said by-pass valve, said pressure relief valve, and said manually operable vent valve directly onto said body.

15. The storage tank of claim 14 wherein said conduit further comprises a pipe communicating between said portion of said conduit provided within said body and said receptacle.

16. The storage tank of claim 15 wherein said vent line further comprises a vent pipe communicating between said portion of said vent line provided within said body and said vent stack.

17. The storage tank of claim 16 wherein said combined fill and vent assembly is modular consisting of components that can be assembled with said pipe and said receptacle extendable in one of a plurality of directions.

18. The storage tank of claim 17 wherein said components can be assembled with said vent pipe extendable in one of a plurality of directions.

19. The storage tank of claim 18 wherein said storage tank is a vehicular fuel storage tank mountable on a curb-side or a road-side of a vehicle and said pipe can be oriented so that said receptacle is accessible from beside said vehicle.

20. The storage tank of claim 1 wherein said conduit penetrates through said outer shell and said inner vessel at a point where said conduit can be integrated with elements of said support structure.

21. The storage tank of claim 1 further comprising a pressure relief valve disposed in a vent line that branches from a conduit through which said cryogenic liquid is removable from said cryogen space.

22. The storage tank of claim 1 wherein said receptacle comprises a valve member that is biased against a seat, whereby said cryogenic liquid can not flow through said receptacle when said valve member is in contact with said seat, and said valve member is mechanically moved away from said seat when a re-filling nozzle is attached to said receptacle.

23. The storage tank of claim 1 further comprising a pressure gauge in communication with said conduit between said check valve and said cryogen space.

24. The storage tank of claim 1 wherein said by-pass line is configured to restrict flow therethrough compared to said conduit, whereby higher fluid flow rates are permitted through said conduit.

25. The storage tank of claim 1 wherein said storage tank is mobile.

26. The storage tank of claim 25 wherein said storage tank is mountable on a vehicle.

27. The storage tank of claim 1 where said storage tank is vehicular fuel tank.

28. A combined fill and vent assembly for a storage tank for a cryogenic liquid, said combined fill and vent assembly comprising an integrated valve assembly comprising a body in which a check valve and a by-pass valve are mounted, said body comprising fluid passages provided therein to allow fluid to flow through said body between a conduit that is connectable to a nozzle receptacle and a flanged connection that can be mounted to a corresponding flange of said storage tank, said fluid passages providing a one-way fluid path from said receptacle to said flanged connection through said check valve and a bypass passage through which fluid can flow from said flanged connection to said receptacle through said by-pass valve when said by-pass valve is open.

29. The combined fill and vent assembly of claim 28 further comprising a pressure relief valve mounted to said body and additional fluid passages within said body through which fluid can be vented from said flanged connection to a vent line, through said pressure relief valve.

30. The combined fill and vent assembly of claim 29 further comprising a second vent valve mounted to said body and additional fluid passages within said body through which fluid can be vented from said flanged connection to said vent line, through said second vent valve.

31. The combined fill and vent assembly of claim 30 wherein said second vent valve is a manually operable valve.

32. The combined fill and vent assembly of claim 30 wherein said second vent valve is a second pressure relief valve with a pressure set point for opening that can be set higher than that of said other pressure relief valve.

33. The combined fill and vent assembly of claim 28 wherein said receptacle is mountable onto said body.

34. A method of re-filling a storage tank with a cryogenic liquid, said method comprising:
    attaching a re-filling nozzle to a receptacle mounted on a conduit that communicates between said receptacle and a cryogen space defined within said storage tank;
    opening a by-pass valve to vent vapor from said cryogen space through a by-pass line that communicates with said conduit on opposite sides of a check valve, until vapor pressure within said cryogen space is reduced to a predetermined value and directing said vented vapor from said cryogen space, through said conduit, through said re-filling nozzle and back through a fill line associated with said re-filling nozzle, thereby pre-cooling said re-filling nozzle and said fill line; and
    after shutting said by-pass valve, directing a cryogenic liquid into said cryogen space through said conduit and said check valve.

35. The method of claim 34 wherein said predetermined value that pressure is reduced to within said cryogen space is atmospheric pressure.

36. The method of claim 34 wherein when re-filling said cryogen space with said cryogenic liquid, said method further comprises directing said cryogenic liquid into an upper portion of said cryogen space which is normally occupied with vapor when said cryogen space is filled.

37. The method of claim 34 wherein said cryogenic liquid is selected from the group consisting of natural gas, nitrogen, oxygen, carbon dioxide, methane, and hydrogen.

38. The method of claim 34 wherein said cryogenic liquid is a fuel that is combustible in an internal combustion engine.

39. The method of claim 34 further comprising, in predetermined conditions, venting said cryogen space through a vent line communicating with said conduit between said check valve and said cryogen space.

40. The method of claim 39 further comprising venting through said vent line by manual operation of a valve disposed in said vent line.

41. The method of claim 39 wherein one of said predetermined conditions is when vapor pressure within said cryogen space exceeds a predetermined set point, whereupon a pressure relief valve disposed in said vent line automatically opens.

42. The method of claim 41 further comprising surrounding said pressure relief valve with a housing that seals it from the surrounding atmosphere.

43. The method of claim 34 further comprising integrating portions of said conduit and said by-pass line within a body within which said check valve is housed.

* * * * *